(12) United States Patent
Thompson (10) Patent No.: US 12,275,538 B2
(45) Date of Patent: Apr. 15, 2025

(54) LIGHTNING STRIKE PROTECTION LAYER (71) Applicant: AIRBUS OPERATIONS LIMITED, Bristol (GB)

(72) Inventor: Sam Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 63 days.

(21) Appl. No.: 18/096,473

(22) Filed: Jan. 12, 2023

(65) Prior Publication Data
US 2023/0219696 A1 Jul. 13, 2023

(30) Foreign Application Priority Data
Jan. 13, 2022 (GB) ...................................... 2200392

(51) Int. Cl.
*B64D 45/02* (2006.01)
*B32B 3/06* (2006.01)
(Continued)

(52) U.S. Cl.
CPC ................ *B64D 45/02* (2013.01); *B32B 3/06* (2013.01); *B32B 5/02* (2013.01); *B32B 5/26* (2013.01); *B32B 15/02* (2013.01); *B32B 15/043* (2013.01); *B32B 15/14* (2013.01); *B32B 15/20* (2013.01); *B64C 1/12* (2013.01); *B29C 70/68* (2013.01); *B29K 2105/08* (2013.01); *B29K 2307/04* (2013.01); *B29K 2309/08* (2013.01); *B29K 2705/10* (2013.01); *B29K 2995/0005* (2013.01); *B29L 2031/3085* (2013.01);
(Continued)

(58) Field of Classification Search
None
See application file for complete search history.

(56) References Cited

U.S. PATENT DOCUMENTS

| 4,888,451 | A | 12/1989 | Toni et al. |
| 8,715,824 | B2 | 5/2014 | Rawlings et al. |

(Continued)

FOREIGN PATENT DOCUMENTS

| EP | 2 781 452 A1 | 9/2014 |
| WO | 2005/032812 A2 | 4/2005 |
| WO | 2019/234693 | 12/2019 |

OTHER PUBLICATIONS

Combined Search and Examination Report for GB2200392.5, dated Jul. 8, 2022, 6 pages.
(Continued)

*Primary Examiner* — Seth Dumbris
(74) *Attorney, Agent, or Firm* — Nixon & Vanderhye P.C.

(57) ABSTRACT

A lightning strike protection layer for an aircraft is disclosed having a first portion and a second portion, the first portion includes a first fibre reinforced polymer composite layer and a first electrically conductive metal layer and the second portion includes a second fibre reinforced polymer composite layer and a second electrically conductive metal layer, and the first and second portions are joined at a butt joint, with the first and second fibre reinforced polymer composite layers abutting and the first and second electrically conductive metal layers abutting; and a butt-strap extending across the butt joint, the butt-strap comprising a third electrically conductive metal layer electrically connected to the first and second electrically conductive metal layers.

16 Claims, 8 Drawing Sheets

(51) Int. Cl.
- B32B 5/02 (2006.01)
- B32B 5/26 (2006.01)
- B32B 15/02 (2006.01)
- B32B 15/04 (2006.01)
- B32B 15/14 (2006.01)
- B32B 15/20 (2006.01)
- B64C 1/12 (2006.01)
- B29C 70/68 (2006.01)
- B29K 105/08 (2006.01)
- B29K 307/04 (2006.01)
- B29K 309/08 (2006.01)
- B29K 705/10 (2006.01)
- B29L 31/30 (2006.01)
- B64C 23/06 (2006.01)

(52) U.S. Cl.
CPC ... *B32B 2260/023* (2013.01); *B32B 2260/046* (2013.01); *B32B 2262/101* (2013.01); *B32B 2262/106* (2013.01); *B32B 2307/202* (2013.01); *B32B 2605/18* (2013.01); *B64C 23/069* (2017.05)

(56) References Cited

U.S. PATENT DOCUMENTS

| | | | |
|---|---|---|---|
| 9,051,060 | B2 | 6/2015 | Fisset et al. |
| 10,351,259 | B2 | 7/2019 | Rahamat et al. |
| 10,843,420 | B2 | 11/2020 | Elilis et al. |
| 10,875,663 | B2* | 12/20 | Tuck .................. B29C 66/7314 |
| 2005/0181203 | A1* | 8/2005 | Rawlings ............ B32B 38/0008 |
| | | | 428/458 |
| 2005/0213278 | A1* | 9/2005 | Hawley .................. B64D 45/02 |
| | | | 361/212 |
| 2015/0174860 | A1 | 6/2015 | Ellis et al. |
| 2016/0031569 | A1 | 2/2016 | Karch et al. |
| 2017/0173919 | A1 | 6/2017 | Cross |
| 2017/0291386 | A1 | 10/2017 | Karch et al. |
| 2020/0315072 | A1 | 10/2020 | Howland |
| 2021/0283883 | A1 | 9/2021 | Hebert et al. |

OTHER PUBLICATIONS

Extended European Search Report for Application No. EP 23150613.0, eight pages, May 24, 2023.

* cited by examiner

LIGHTNING STRIKE PROTECTION LAYER

CROSS RELATED APPLICATION

This application claims priority to United Kingdom Patent Application GB 2200392.5, filed Jan. 13, 2022, the entire contents of which is hereby incorporated by reference.

FIELD OF THE INVENTION

The present invention relates to a lightning strike protection layer, an aircraft structure, an aircraft, and a method of manufacturing a lightning strike protection layer.

BACKGROUND OF THE INVENTION

Lightning strikes to aircraft are frequent occurrences, which can generate high forces and temperatures that may cause structural damage and systems disruption if not appropriately designed for. Lightning strike protection of composite airframe structures often involves the use of one or more lightning strike protection layers, with these often including expanded metal foils (such as expanded copper foil) placed on the top of the composite aircraft skin. The expanded metal foil layer helps to dissipate the lightning strike energy over the surface, e.g. of an airframe component, since the electrical conductivity of metals is significantly larger than that of conventional composite laminates (such as glass fibre and carbon fibre composite laminates). As a result, electrical potential from the lightning strike flows through the lightning strike protection layer without directly affecting the composite structure beneath.

However, aircraft typically have complex geometries, involving three-dimensional curvature, and this can necessitate the use of multiple smaller, discrete, lightning strike protection layers that each cover a portion of the aircraft. It is important that these discrete lightning strike protection layers are adequately electrically connected to avoid problems such as a build-up of charge. Particularly as a significant proportion of repairs to aircraft wings are due to lightning strike damage, especially at the joins between the discrete lightning strike protection layers.

SUMMARY OF THE INVENTION

A first aspect of the invention provides a lightning strike protection layer for an aircraft, comprising: a first portion and a second portion, wherein the first portion comprises a first fibre reinforced polymer composite layer and a first electrically conductive metal layer and the second portion comprises a second fibre reinforced polymer composite layer and a second electrically conductive metal layer, wherein the first and second portions are joined at a butt joint, with the first and second fibre reinforced polymer composite layers abutting and the first and second electrically conductive metal layers abutting; and a butt-strap extending across the butt joint, the butt-strap comprising a third electrically conductive metal layer electrically connected to the first and second electrically conductive metal layers.

With this arrangement, thickness increase in the through-thickness direction of the lightning strike protection layer is minimised, whilst electrically connection between the electrically conductive metal layers of the first and second portions is ensured by the third electrically conductive metal layer. This provides for a simple join between adjacent and abutting portions of a lightning strike protection layer that reduces manufacturing costs and minimises lead time. Whilst also minimising disruption, wrinkles and other defects across the joint.

The lightning strike protection layer may comprise a third fibre reinforced polymer composite layer extending across the butt joint and adjacent the first and second fibre reinforced polymer composite layers.

With this arrangement, the joint between the abutting first and second portions is strengthened, with the third fibre reinforced polymer composite layer protecting the joint and the edges of the first and second portions from abrasion and micro-cracking.

Each fibre reinforced polymer composite layer may be a glass fibre reinforced polymer layer and/or a carbon fibre reinforced polymer layer.

Each electrically conductive metal layer may be an expanded metal foil layer.

Each electrically conductive metal layer may be an electrically conductive copper layer.

A second aspect of the invention provides an aircraft structure, comprising: an aircraft skin layer, and the lightning strike protection layer of the first aspect laid on top of the aircraft skin layer.

The aircraft skin layer may have curvature in two orthogonal directions, and the lightning strike protection layer may be laid on top of the curvature.

Joints may often be formed in a lightning strike protection layer due to geometrical restrictions. For example, a lightning strike protection layer may have difficulty in extending over curved parts without forming portions with wrinkles and portions in which the layer is stretched. The motivation for these curves may further drive the need for a join between these portions of the lightning strike protection layer, such as that of the first aspect, which has relatively little impact on the overall thickness and is easy to manufacture.

The aircraft structure may be a wing tip or wing tip device.

A third aspect of the invention provides an aircraft, the aircraft comprising the aircraft structure of the second aspect.

A fourth aspect of the invention provides a method of manufacturing a lightning strike protection layer for an aircraft, the method comprising: providing a mould; providing a first portion and a second portion of a lightning strike protection layer, wherein the first portion comprises a first fibre preform layer and a first electrically conductive metal layer and the second portion comprises a second fibre preform layer and a second electrically conductive metal layer; laying the first portion and the second portion into the mould to form a butt joint, wherein the first and second fibre preform layers abut and the first and second electrically conductive metal layers abut; and laying a third electrically conductive metal layer across the butt joint to form a butt-strap so as to electrically connect to the first and second electrically conductive metal layers.

With this arrangement, and integral lightning strike protection layer can be formed in which the manufacturability is increased and the overall thickness is decreased.

Each fibre preform layer may be a glass fibre preform layer and/or a carbon fibre preform layer.

Each electrically conductive metal layer may be an expanded metal foil layer.

Each electrically conductive metal layer may be an electrically conductive copper layer.

The first fibre preform layer may be laid between the first electrically conductive metal layer and the mould, and the second fibre preform layer may be laid between the second electrically conductive metal layer and the mould.

The method may further comprise providing a third fibre preform layer, and laying the third fibre preform layer in the mould prior to laying the first and second portions in the mould, and wherein the first and second portions are laid in the mould such that the third fibre preform layer extends across the butt joint and adjacent the first and second fibre preform layers.

The mould may have curvature in two orthogonal directions, and the method may comprise laying the lightning strike protection layer on the curvature of the mould.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
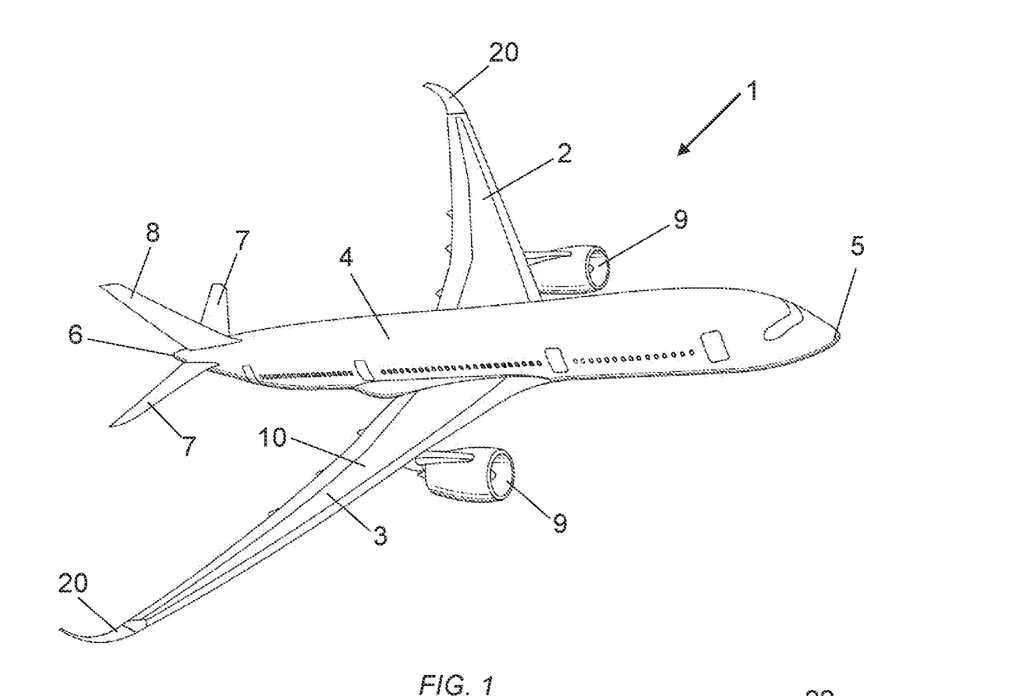
FIG. 1 shows an aircraft.

FIG. 1 illustrates a typical fixed wing aircraft 1. The aircraft 1 may have a port wing 2 and a starboard wing 3 that extend from a fuselage 4. Each wing 2, 3 may carry wing mounted engines 9. The fuselage 4 has a nose 5 and a tail 6. The tail 6 may have horizontal and vertical stabiliser surfaces 7, 8. The aircraft 1 may be a typical jet passenger transport aircraft although the invention is applicable to a wide variety of fixed wing aircraft types, including commercial, military, passenger, cargo, jet, propeller, general aviation, etc. with any number of engines attached to the wings or fuselage.

The wings 2, 3 are similar in construction so only the port wing 2 will be described in detail with reference to FIG. 2.

The wing 3 of the aircraft 1 may have a main wing portion 10 that is a cantilevered structure with a length extending in a span-wise direction from a wing root to a wing tip, the root being joined to the aircraft fuselage 4. The wing 3 may have a plurality of flight control surfaces, such as slats 12, ailerons 13, air brakes/spoilers 14, and flaps 15. A wing tip device 20 may be provided on the tip end of each wing 2, 3.

The wing tip device 20 extends between a root end 21, attached to a main wing portion of the wing 3, and a tip end 22 defining an outermost spanwise position of the wing 3.

Figure 2:
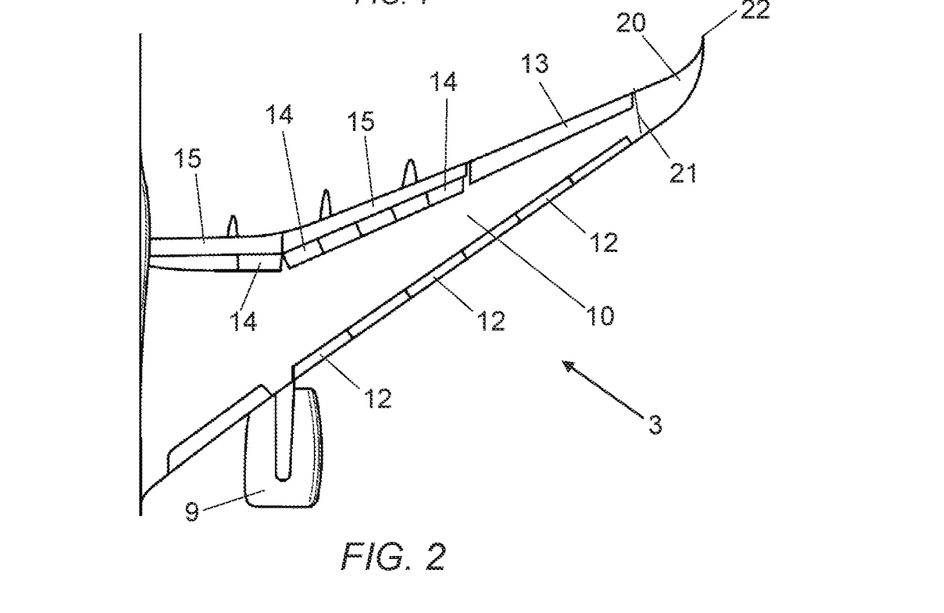
FIG. 2 shows a port wing of the aircraft.

An increasing proportion of aircraft 1, such as shown in FIGS. 1 & 2, are being constructed from comparatively lighter weight materials than the metals historically used on aircraft 1 (e.g. aluminium). However, in some applications composite materials can be inadequate conductors of electricity, and this can necessitate the use of lightning strike protection layers 30 forming part of the outer skin of the aircraft 1. Expanded metal foils, such as aluminium, brass and copper, are common choices to incorporate in the lightning strike protection layers.

Figure 3:
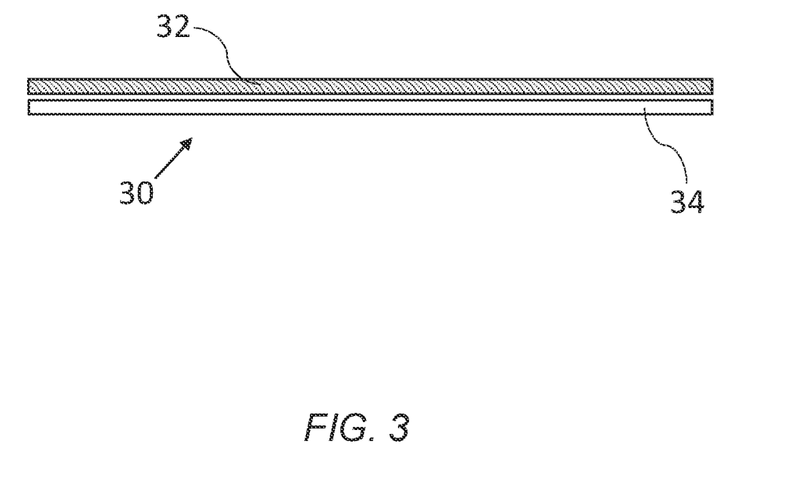
FIG. 3 shows an example of a lightning strike protection layer.

FIG. 3 shows an example of a lightning strike protection layer 30 including a fibre reinforced composite layer 32 and an electrically conductive metal layer 34. The electrically conductive metal layer 34 may be an expanded metal foil layer, such as a copper mesh, aluminium mesh, or bronze mesh. Alternatively, the electrically conductive metal layer 34 may be a solid sheet of metal 34, or similar.

In some examples, the fibre reinforced composite layer 32 may form an outer layer of the aircraft 1 with respect to the electrically conductive metal layer 34, or the lightning strike protection layer 30 may include one or more electrically conductive metal layers 34 in the absence of an outer fibre reinforced composite layer 32. The fibre reinforced composite layer 32 may protect the electrically conductive metal layer 34, for example the fibre reinforced composite layer 32 may provide structural protection or abrasion protection to the electrically conductive metal layer 34.

As aircraft 1 typically have complex geometries, involving complex curvatures (i.e. having curvature in two orthogonal directions), there is often a need to manufacture the lightning strike protection layer 30 as multiple discrete portions 31a, 31b that each cover a portion of the aircraft 1. The alternative is to introduce distortions or fold lines in the lightning strike protection layer 30, however this can introduce discontinuities in the aircraft skin that are undesirable for reasons of aerodynamics and electrical conductivity.

Additionally, as described above, the lightning strike protection layer 30 is often formed of multiple layers stacked in the through-thickness direction (e.g. a fibre reinforced composite layer 32 and an electrically conductive metal layer 34), and there may be a reduction in the manufacturing lead times if those multiple layers are stacked as a single unit prior to assembly to the aircraft 1. However, this advantage is often counteracted by the reduced drapability of thicker lightning strike protection layers 30 during manufacture, such that the lightning strike protection layer 30 often requires splitting into further discrete portions 31a, 31b to compensate for its reduced drapability (especially when draped upon complex geometries), and this can mitigate many of the advantages mentioned above.

These discrete portions 31a, 31b of the lightning strike protection layer 30 introduce discontinuities in the lightning strike protection layer 30, and it is therefore important to ensure the portions 31a, 31b of the lightning strike protection layer 30 are electrically connected.

One approach is to individually lay up the layers 32, 34 such that the layers 32, 34 of each portion 31a, 31b overlap and interlock with the layers 32, 34 of the other portion 31a, 31b. However, such overlapping is time consuming. An alternative approach is to pre-form the layers 32, 34 into a portions 31a, 31b, and to overlap the portions 31a, 31b to form a lap joint. However, this can create an excessive build-up of thickness at the join, which can have knock-on effects such as wrinkles in the lightning strike protection layer 30, as well as variations in fibre volume fraction and part thickness variations (among others). Such a join in the lightning strike protection layer 30 may also lead to increased build up of current, and increased dissipation of current between the overlapping layers 32, 34, particularly when the highly conductive electrically conductive metal layers 34 are separated by the comparatively low conductivity fibre reinforced composite layers 32.

Figure 4:
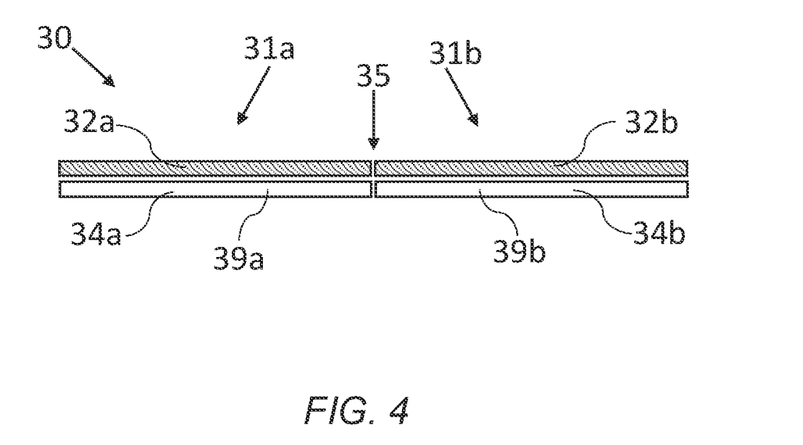
FIG. 4 shows a first portion and a second portion of a lightning strike protection layer forming a butt-joint according to an example of the invention.

According to an example of the invention, there is provided a lightning strike protection layer 30 comprising a first portion 31a and a second portion 31b. The first portion 31a comprises a fibre reinforced composite layer 32a and an electrically conductive metal layer 34a, such as an expanded metal foil layer 39a. Similarly, the second portion 31b comprises a fibre reinforced composite layer 32b and an electrically conductive metal layer 34b, such as an expanded metal foil layer 39b.

The first and second portions 31a, 31b are joined at a butt joint 35, with the fibre reinforced composite layer 32a of the first portion 31a abutting the fibre reinforced composite layer 32b of the second portion 31b, and the electrically conductive metal layer 34a of the first portion 31a abutting the electrically conductive metal layer 34b of the second portion 31b. It should be noted that abutting refers to the respective layers touching one another or being next to one another (i.e. directly adjacent).

An example of this arrangement is shown in FIG. 4. In this example, the first portion 31a and the second portion 31b directly contact, such that at least some direct electrical contact may be made between the electrically conductive metal layers 34a, 34b of the first and second portions 31a, 31b.

Figure 5:
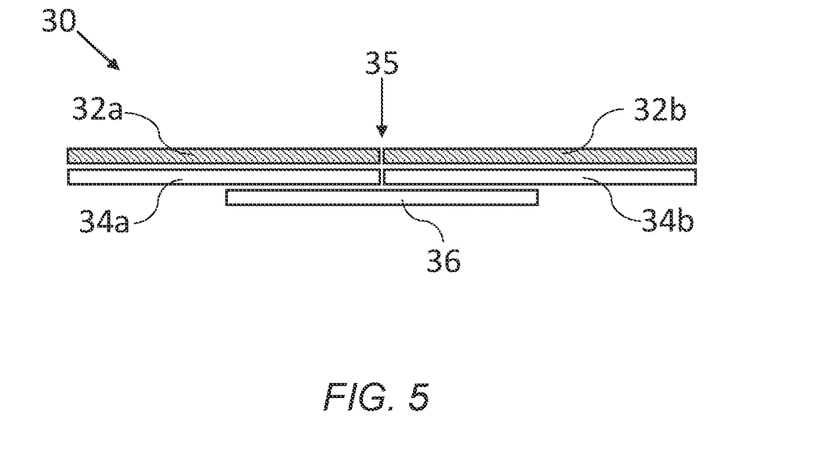
FIG. 5 shows an electrically conductive metal layer forming part of the butt-strap that extends across the butt-joint.

To electrically connect the electrically conductive metal layers 34a, 34b of the first and second portions 31a, 31b across the butt joint 35 (or at least improve the electrical connection), an additional (overlapping) electrically conductive metal layer 36 overlaps a portion of the electrically conductive metal layer 34a, 34b of the first and second portions 31a, 31b and extends across the butt joint 35. In other words, the additional electrically conductive metal layer 36 is physically and electrically connected to the electrically conductive metal layer 34a, 34b of the first and second portions 31a, 31b. The overlapping metal layer 36 forms part of a butt-strap joint that extends across the butt joint 35. An example is shown in FIG. 5.

Whilst conventionally an additional component (in this case the additional electrically conductive metal layer 36) is considered to increase manufacturing lead times, and thereby slow production, the increased speed at which a butt joint 35 may be created compensates for the additional time required to add the overlapping electrically conductive metal layer 36.

As a result, the first and second portions 31a, 31b of the lightning strike protection layer 30 are electrically connected, whilst the thickness of the lightning strike protection layer 30 is minimised and the discontinuities across the butt joint 35 are minimised. The manufacturing process of forming the lightning strike protection layer 30 is also simplified, reducing manufacturing lead times.

The fibre reinforced composite layers 32a, 32b of the first and second portions 31a, 31b may form an outer face of the lightning strike protection layer 30, such that the electrically conductive metal layers 34a, 34b of the first and second portions 31a, 31b form an inner face of the lightning strike protection layer 30.

The combination of fibre reinforced composite layers 32a, 32b with the electrically conductive metal layers 34a, 34b assists in compensating for the increased thermal expansion coefficient of the electrically conductive metal layers 34a, 34b, as the increased thermal expansion coefficient of the electrically conductive metal layers 34a, 34b is at least partially balanced out by the thermal expansion coefficient of the fibre reinforced composite layers 32a, 32b so as to more closely align with the overall composite component expansion ratios of the aircraft structure (such as the aircraft skin beneath the lightning strike protection layer 30, discussed below).

Each of the electrically conductive metal layers 34a, 34b, 36 may comprise any suitable metal, such as copper, brass, aluminium, or bronze. The electrically conductive metal layers 34a, 34b, 36 of a lightning strike protection layer 30 may be the same metal, or one or more of the electrically conductive metal layers 34a, 34b, 36 may be a different metal to the other electrically conductive metal layers 34a, 34b, 36. Each electrically conductive metal layer 34a, 34b, 36 may have a thickness of between 2 and 20 microns. The electrically conductive metal layers 34a, 34b, 36 may each be an expanded metal foil layer. Alternatively, the electrically conductive metal layer 34 may be a solid sheet of metal 34, or similar.

Figure 6:
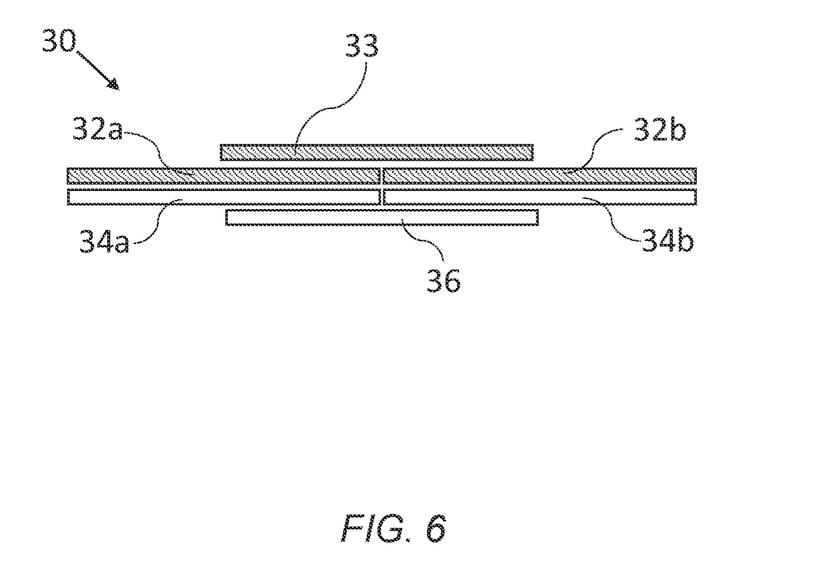
FIG. 6 shows a fibre reinforced polymer composite layer forming part of the butt-strap on an opposite side of the butt joint to the electrically conductive metal layer.

As shown in FIG. 6, the lightning strike protection layer 30 may include one or more additional (overlapping) fibre reinforced polymer composite layers 33. The overlapping fibre reinforced polymer composite layers 33 may extend across the butt joint so as to be adjacent the fibre reinforced polymer composite layers 32a, 32b of the first and second portions 31a, 31b. The overlapping fibre reinforced polymer composite layer 33 forms part of the butt-strap. The overlapping fibre reinforced polymer composite layer(s) 33 may assist in abrasion protection of the butt joint 35 and/or a reduction of micro-crack propagation due to thermal cycling, which may occur due to the temperature variations experienced towards the outer skin of the aircraft 1.

In addition, or alternatively, the lightning strike protection layer 30 may include one or more fibre reinforced polymer composite layers 37 adjacent an internal side, such that the one or more fibre reinforced polymer composite layers 37 are adjacent the overlapping electrically conductive metal layer 36 and/or the electrically conductive metal layers 34a, 34b of the first and second portions 31a, 31b. An example in shown in FIG. 7.

It will be understood that the lightning strike protection layer 30 is formed from a composite preform assembly. "Preform" refers to the fact the fibre reinforced composite layers 32a, 32b are not cured until after final assembly of the lightning strike protection layer 30, such that the fibre reinforced composite layers 32 may be referred to as fibre preform layers 132a, 132b.

The fibre preform layers 132a, 132b may comprise any suitable reinforcing fibres, such as glass fibres and/or carbon fibres, with the fibres of the layers 32 pre-impregnated with a resin (i.e. a pre-preg preformed fibre composite material) or dry fibre preforms to which a resin is impregnated after assembly (e.g. by resin transfer moulding, RTM), as known in the art. It will be understood that the fibre reinforced composite layers 32a, 32b will similarly comprise these reinforcing fibres once the fibre preform layers 132a, 132b are cured.

FIGS. 8A to 13 schematically show the method of a composite preform assembly, and in particular a method of manufacturing a lightning strike protection layer for an aircraft.

Figure 8A:
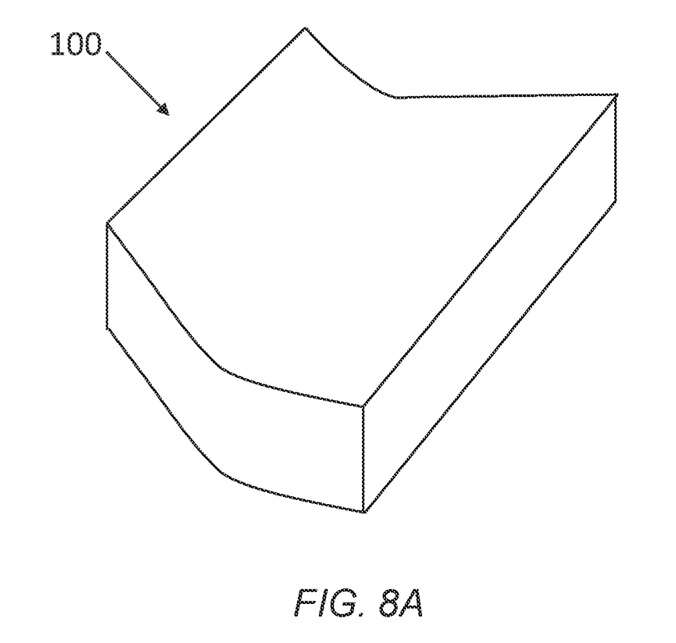
FIG. 8A shows a perspective view of a mould.
Figure 8B:
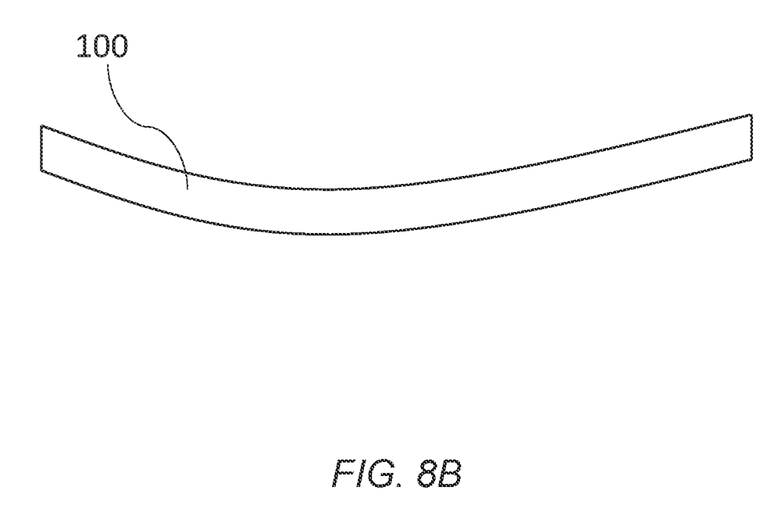
FIG. 8B shows a side view of the mould.

FIGS. 8A & 8B show a mould 100. The mould 100 may have curvature in two orthogonal directions, as shown most clearly in FIG. 8A.

Figure 9:
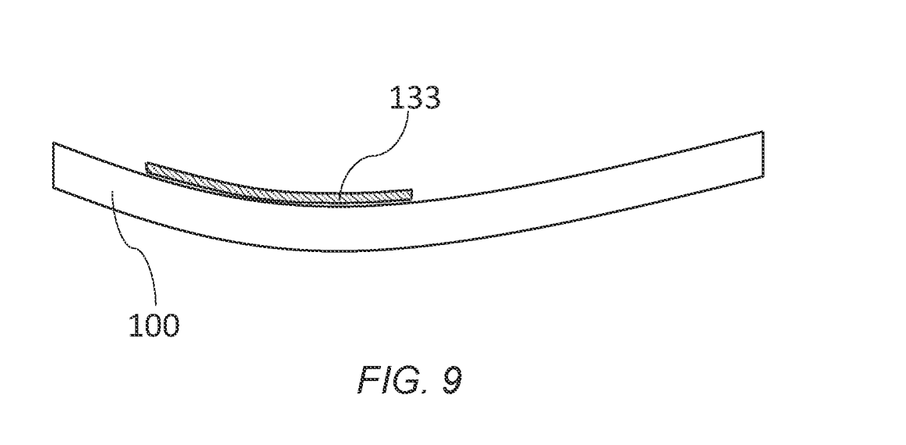
FIG. 9 shows fibre preform layer laid into the mould.

A fibre preform layer 133 may be laid into the mould 100, such as shown in FIG. 9.

Figure 10:
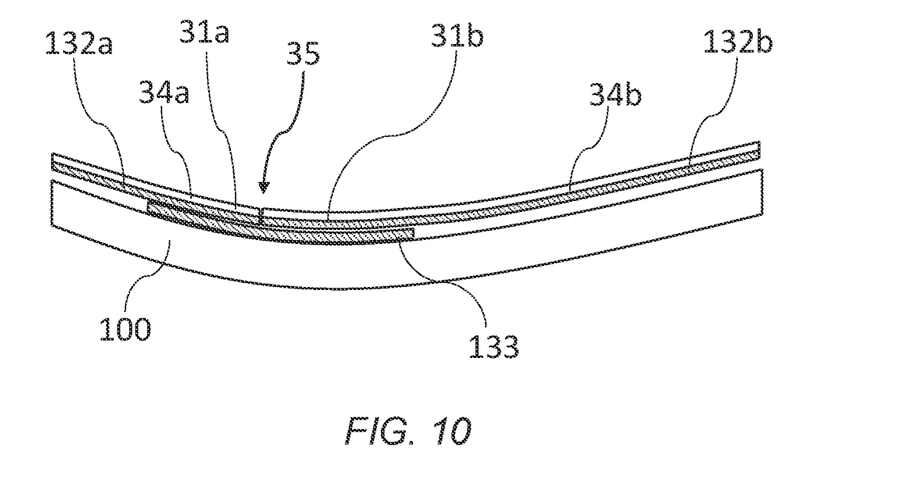
FIG. 10 shows a first portion and a second portion of a composite preform assembly laid into the mould.

A first portion 31a and a second portion 31b of a composite preform assembly may be laid into the mould 100, such as shown in FIG. 10.

The first portion 31a may comprise a first fibre preform layer 132a and a first electrically conductive metal layer 34a and the second portion may comprise a second fibre preform layer 132b and a second electrically conductive metal layer 34b.

The first portion 31a and the second portion 31b meet in the mould 100 to form a butt joint 35, such that the first and second fibre preform layers 132a, 132b abut and the first and second electrically conductive metal layers abut 34a, 34b. The first portion 31a and the second portion 31b may be arranged in to mould 100 such that the fibre preform layer 133 is located over at least a portion of the butt joint 35, forming an overlapping fibre preform layer 133 with respect to the first portion 31a and second portion 31b.

It will be understood that the fibre preform layer 133 first laid into the mould 100 is optional, such that the first portion 31a and second portion 31b may be laid directly in the mould 100 without a fibre preform layer 133 between any of the first and second portions 31a, 31b and the mould 100.

In either case, the first and second portions 31a, 31b are laid such that the first and second fibre preform layers 132a, 132b are adjacent a surface of the mould 100, with the electrically conductive metal layers 34a, 34b of the first and second portions 31a, 31b comparatively distal from the surface of the mould 100.

Figure 11:
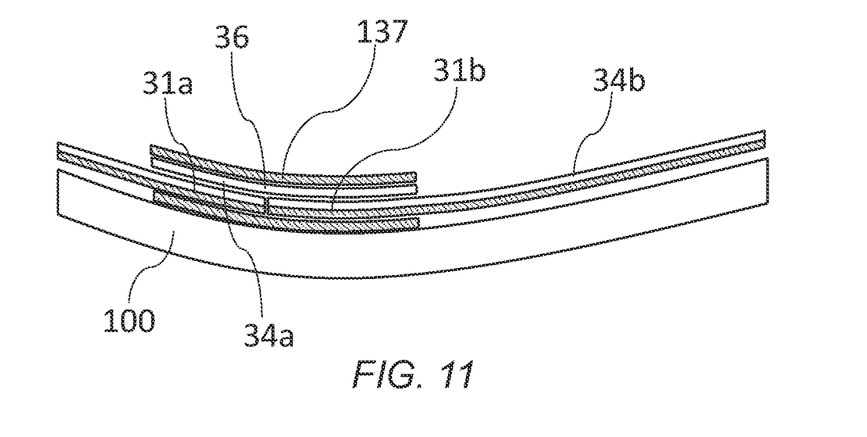
FIG. 11 shows a butt-strap extending across the butt joint of the first and second portions.

An additional electrically conductive metal layer 36 may then be laid across the butt joint 35 of the first and second portions 31a, 31b, such as shown in FIG. 11, with the additional electrically conductive metal layer 36 located adjacent the electrically conductive metal layers 34a, 34b of the first and second portions 31a, 31b so as to electrically connect to the electrically conductive metal layers 34a, 34b of the first and second portions 31a, 31b.

As additionally shown in FIG. 11, the composite preform assembly may also include one or more fibre preform layers 137 adjacent the overlapping electrically conductive metal layer 36 and/or the electrically conductive metal layers 34a, 34b of the first and second portions 31a, 31b.

Figure 7:
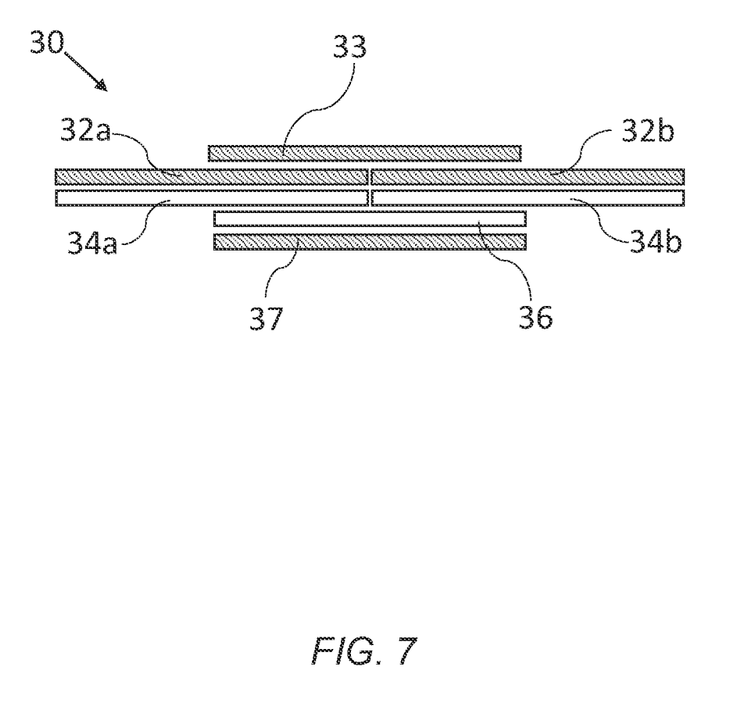
FIG. 7 shows a fibre reinforced polymer composite layer forming part of the butt-strap adjacent the electrically conductive metal layer.

The composite preform assembly may then be manufactured so as to produce a lightning strike protection layer 30, such as shown in FIGS. 5 to 7.

Figure 12:
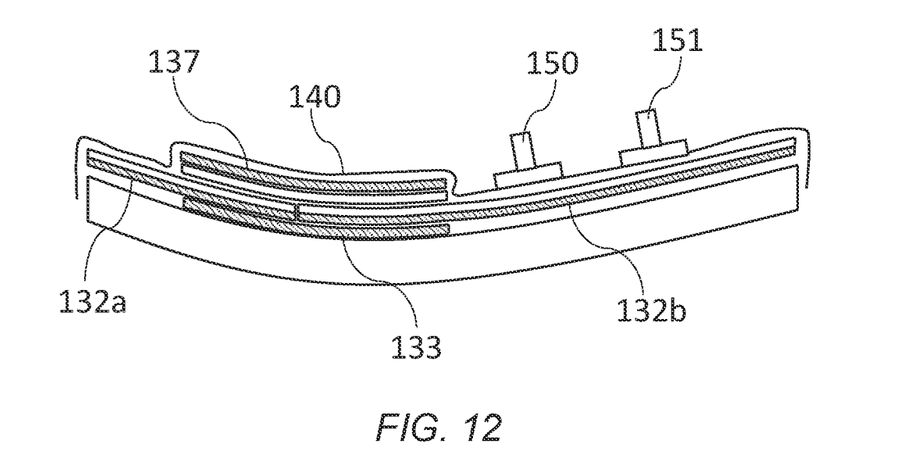
FIG. 12 shows the composite preform assembly consolidated under vacuum pressure.
Figure 13:
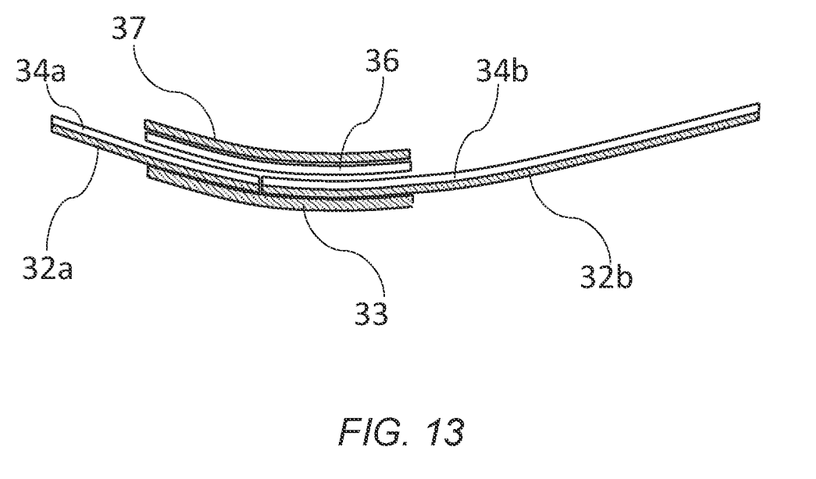
FIG. 13 shows the unitary lightning strike protection layer after curing the composite preform assembly.

This may involve consolidating the layers in the mould 100, for example by forming a vacuum seal. As shown in FIG. 12, a plastic film or sheet 140 may be placed over the mould 100, so as to cover the first and second portions 31a, 31b, the electrically conductive metal layer 36, the fibre preform layer 133 and any other layers of the composite preform assembly. A vacuum pressure may then be applied via a valve 150. Consolidating the layers helps to form electrical contact between the layers, and in particular the overlapping electrically conductive metal layer 36 with the electrically conductive metal layers 34a, 34b of the first and second portions 31a, 31b.

After consolidating the layers, a resin may be introduced into the fibre preform layers 132a, 132b, 133, 137. For example, the resin may be infused through the fibre preform layers 132a, 132b, 133, 137 via a second valve 151 whilst still under the vacuum pressure. The resin may also infuse the other layers of the composite preform assembly, such as the electrically conductive metal layers 34a, 34b, 36. Alternatively, in some examples, the fibre preform layers 132a, 132b may be composite pre-preg layers (i.e. fibre layers pre-impregnated with resin) in which case infusion of a resin via the second valve 151 is not necessary.

The resin may then be cured to form the lightning strike protection layer 30 described previously, and as shown for example in FIG. 13, such that the lightning strike protection layer 30 is a unitary structure for forming the outer layer of an aircraft 1 or similar structure. Curing the resin may involve applying heat and/or pressure to the composite preform assembly.

It will be clear to the skilled person that the examples described above may be adjusted in various ways. For example, the lightning strike protection layer 30 is referred to as forming part of the outer layers of an aircraft 1, however it will be understood that further layers (e.g. binder layers, adhesive layers and/or paint layers) may be laid on top or within the lightning strike protection layer 30.

Figure 14:
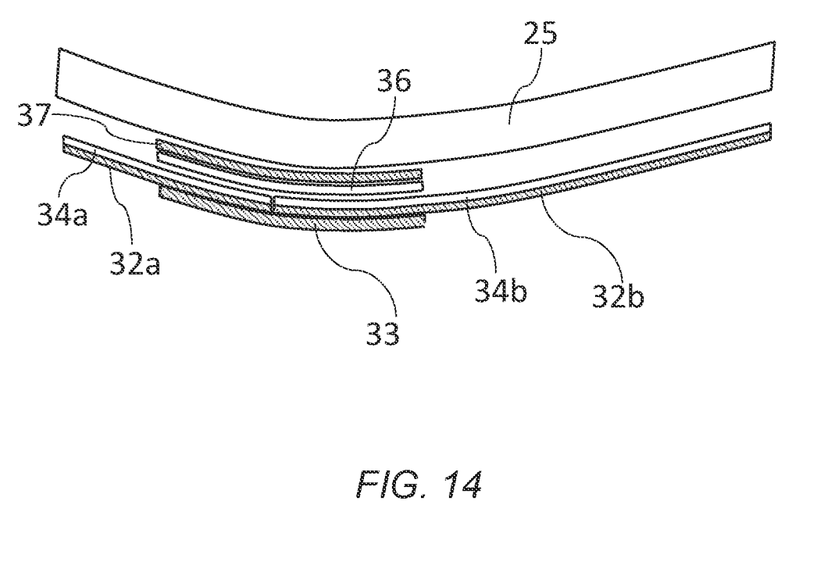
FIG. 14 shows the lightning strike protection layer laid on top of a corresponding aircraft skin layer.

The lightning strike protection layer 30 may subsequently be laid on top of a corresponding aircraft skin layer 25, such as shown schematically in FIG. 14.

The examples referred to above are described in relation to their use as the lightning strike protection layer 30 on an aircraft 1, such as part of a wing tip or wing tip device 20 on an aircraft 1. However, the described lightning strike protection layer 30 is suitable for any location on an aircraft 1, or any other structure in which lightning strike protection on an underlying structure may be required.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A lightning strike protection layer for laying on top of an aircraft structure, comprising:
    a first portion and a second portion, wherein the first portion comprises a first fibre reinforced polymer composite layer and a first electrically conductive metal layer and the second portion comprises a second fibre reinforced polymer composite layer and a second electrically conductive metal layer,
    wherein the first and second portions are joined at a butt joint, with the first and second fibre reinforced polymer composite layers abutting and the first and second electrically conductive metal layers abutting;
    a butt-strap extending across the butt joint, the butt-strap comprising a third electrically conductive metal layer electrically connected to the first and second electrically conductive metal layers;
    a third fibre reinforced polymer composite layer extending across the butt joint and adjacent the first reinforced polymer composite layer and the second fibre reinforced polymer composite layer on an opposite side of the first and second fibre reinforced polymer composite layers to the third electrically conductive metal layer.

2. The lightning strike protection layer of claim 1, wherein each fibre reinforced polymer composite layer is a glass fibre reinforced polymer layer and/or a carbon fibre reinforced polymer layer.

3. The lightning strike protection layer of claim 1, wherein each electrically conductive metal layer is an expanded metal foil layer.

4. The lightning strike protection layer of claim 1, wherein each electrically conductive metal layer is an electrically conductive copper layer.

5. An aircraft structure, comprising:
an aircraft skin layer, and the lightning strike protection layer of claim 1 laid on top of the aircraft skin layer.

6. The aircraft structure of claim 5, wherein the aircraft skin layer has curvature in two orthogonal directions, and the lightning strike protection layer is laid on top of the curvature.

7. The aircraft structure of claim 5, wherein the aircraft structure is a wing tip or wing tip device.

8. An aircraft comprising the aircraft structure of claim 5.

9. A method of manufacturing a lightning strike protection layer for an aircraft, the method comprising:
providing a mould;
providing a first portion and a second portion of a lightning strike protection layer, wherein the first portion comprises a first fibre reinforced preform polymer layer and a first electrically conductive metal layer and the second portion comprises a second fibre reinforced preform polymer layer and a second electrically conductive metal layer;
laying the first portion and the second portion into the mould to form a butt joint, wherein the first and second fibre reinforced preform polymer layers abut and the first and second electrically conductive metal layers abut;
laying a third electrically conductive metal layer across the butt joint to form a butt-strap so as to electrically connect to the first and second electrically conductive metal layers; and,
further comprising providing a third reinforced fibre preform polymer layer, the method comprising laying the third reinforced fibre preform polymer layer in the mould prior to laying the first and second portions in the mould, and wherein the first and second portions are laid in the mould such that the third reinforced fibre preform polymer layer extends across the butt joint and adjacent the first and second reinforced fibre preform polymer layers, wherein the third reinforced preform polymer layer is provided on an opposite side of the first and second fibre reinforced polymer preform layers to the third electrically conductive metal layer.

10. The method of claim 9, wherein each fibre reinforced preform polymer layer is a glass fibre preform layer and/or a carbon fibre preform layer.

11. The method of claim 9, wherein each electrically conductive metal layer is an expanded metal foil layer.

12. The method of claim 9, wherein each electrically conductive metal layer is an electrically conductive copper layer.

13. The method of claim 9, wherein the first fibre reinforced preform polymer layer is laid between the first electrically conductive metal layer and the mould, and the second fibre reinforced preform polymer layer is laid between the second electrically conductive metal layer and the mould.

14. The method of claim 9, wherein the mould has curvature in two orthogonal directions, and the method comprises laying the lightning strike protection layer on the curvature of the mould.

15. A method of manufacturing an aircraft structure comprising the method of claim 9, further comprising laying the lightning strike protection layer on top of an aircraft skin layer, wherein the fibre reinforced preform polymer layers of the first and second portions form an outer face of the lightning strike protection layer, such that the electrically conductive metal layers of the first and second portions and the third fibre reinforce polymer preform form an inner face of the lightning strike protection layer facing the aircraft skin layer.

16. The aircraft structure of claim 5, wherein the fibre reinforced composite layers of the first and second portions form an outer face of the lightning strike protection layer, such that the electrically conductive metal layers of the first and second portions form an inner face of the lightning strike protection layer facing the aircraft skin layer.

* * * * *